United States Patent
Tanoue et al.

(10) Patent No.: US 6,926,999 B2
(45) Date of Patent: Aug. 9, 2005

(54) POSITIVE ELECTRODE ACTIVE MATERIAL FOR ALKALINE CELL

(75) Inventors: Koji Tanoue, Honjou (JP); Yoshikazu Omoto, Honjou (JP); Yoshiyuki Shoji, Honjou (JP); Masayuki Nishina, Honjou (JP); Toshio Ueda, Akita (JP)

(73) Assignee: Dowa Mining Co., Ltd., Tokyo (JP)

( * ) Notice: Subject to any disclaimer, the term of this patent is extended or adjusted under 35 U.S.C. 154(b) by 523 days.

(21) Appl. No.: 10/129,726

(22) PCT Filed: Sep. 10, 2001

(86) PCT No.: PCT/JP01/07829

§ 371 (c)(1),
(2), (4) Date: May 10, 2002

(87) PCT Pub. No.: WO02/23647

PCT Pub. Date: Mar. 21, 2002

(65) Prior Publication Data

US 2003/0082450 A1 May 1, 2003

(30) Foreign Application Priority Data

Nov. 9, 2000 (JP) .......................................... 2000-275124
Dec. 27, 2000 (JP) .......................................... 2000-398336

(51) Int. Cl.[7] .......................... H01M 4/54; H01M 4/50; H01M 4/52; C01G 5/00; C01G 29/00
(52) U.S. Cl. ....................... 429/219; 429/223; 429/224; 423/594.7; 423/604

(58) Field of Search ................................. 429/219, 218.1, 429/223, 224; 423/594.7, 604, 617

(56) References Cited

U.S. PATENT DOCUMENTS

| 4,520,005 A | 5/1985 | Yao |
| 5,389,469 A | 2/1995 | Passaniti et al. |

FOREIGN PATENT DOCUMENTS

| JP | 52-142241 A | 11/1977 |
| JP | 56-11860 A | 2/1981 |
| JP | 60-112621 | 6/1985 |
| JP | 61-136916 A | 6/1986 |

*Primary Examiner*—Jonathan Crepeau
(74) *Attorney, Agent, or Firm*—McDermott Will & Emery LLP (57) ABSTRACT

A cathode active material for alkaline electrochemical cells comprising an Ag—Bi-M-containing oxidation product produced by oxidizing with an oxidizing agent an Ag—Bi-M-containing neutralized precipitate obtained by reacting inorganic acid salts of silver, bismuth and, optionally, M (M representing at least one metal selected from the group comprised of manganese, nickel and cobalt) with an alkali hydroxide in an aqueous medium; or comprising an Ag—Bi-M-containing oxidation product obtained by reacting inorganic acid salts of silver, bismuth and, optionally, M with an alkali hydroxide in an aqueous medium and in the presence of an oxidizer.

36 Claims, 9 Drawing Sheets

POSITIVE ELECTRODE ACTIVE MATERIAL FOR ALKALINE CELL

TECHNICAL FIELD

This invention relates to a cathode active material for an alkaline electrochemical cell.

BACKGROUND ART

Silver oxide electrochemical cells are widely used as internal alkaline electrochemical cells (commonly called "button cells") in watches, measuring instruments, cameras and the like. Silver oxide electrochemical cells are generally constituted using silver oxide ($Ag_2O$ and/or AgO) as a cathode active material, zinc powder as an anode active material, and an alkaline solution, e.g., an aqueous solution of KOH or NaOH, as an electrolyte. While silver is an expensive material, silver oxide is nonetheless considered an indispensable cathode active material when high capacity is required despite small size. It is therefore no exaggeration to say that almost all button cells are constituted as silver oxide electrochemical cells.

The proportion of silver oxide electrochemical cell unit price accounted for by the cathode active material is ordinarily very high so that silver oxide is a major factor determining cell unit price. As $Ag_2O$ is poor in conductivity, a problem of high internal resistance of the cell lowering the discharge capacity is also a problem. Owing to this, in some cases the cathode active material is prepared by mixing $MnO_2$ with the $Ag_2O$, while it has also been proposed, for example, to improve conductivity by blending with another Ag-system compound such as $AgNiO_2$, as set out in JPA. 60-105170, JPA. 57-849 and JPA. Hei 10-188975.

Similarly, JPA. 52-142241 teaches that addition of an appropriate amount of bismuth oxide powder to a cathode active material composed chiefly of silver oxide enables prediction of the terminal discharge stage and inhibits gassing, without occurrence of excessive deficiency in consumption of the zinc active material and cathode active material.

U.S. Pat. No. 5,389,469, as well as its divisional applications U.S. Pat. No. 5,589,109 and U.S. Pat. No. 6,001,508, discloses a cathode active material consisting of particles composed of an AgO core surrounded by an intermediate layer of $Ag_2O$ and an outer layer of a compound containing silver and bismuth (outer layer composed of $AgBiO_2$ or $AgBiO_3$ compound) and teaches that this material can be obtained by reacting AgO and a bismuth compound (bismuth sulfide) in an aqueous alkaline solution under reducing condition.

PROBLEMS TO BE OVERCOME BY THE INVENTION

An effective way of reducing silver oxide electrochemical cell cost is to lower the relative amount of Ag by making a cheap material other than silver oxide co-present in the cathode active material. In the aforesaid case of making $MnO_2$ co-present, however, no increase in cell capacity can be anticipated because of the properties of $MnO_2$, i.e., small absolute specific gravity and poor flatness of discharge potential. What is more, there is also the attendant problem of a marked drop in discharge potential as discharge progresses. In the case of blending $AgNiO_2$ compound, only slight addition is allowable because the hydroxide this material forms after discharge produces volumetric expansion. Addition of this material can therefore not be expected to have much cost-reducing effect.

In the case of blending bismuth oxide powder with silver oxide as in JPA. 52-142241, the purpose is to utilize the difference in oxidation-reduction potential between bismuth oxide and silver oxide to obtain two potential levels at the end of discharge and thereby enable prediction cell exhaustion immediately before exhaustion. As bismuth oxide does not increase discharge capacity more than silver oxide, the amount of bismuth oxide that can be blended is limited to, at most, 3–12 wt % relative to the total amount of cathode.

In the case where a film of an Ag—Bi—O-system compound is formed on the surface of silver oxide particles, as in U.S. Pat. No. 5,389,469 (and the two cases divided therefrom), the Ag content of the cathode active material must be at least 78 wt %, which is still not low enough from the viewpoint of reducing the amount of Ag used. In the case of particles of a multilayer structure composed of an AgO core surrounded by an intermediate layer of $Ag_2O$ and an outer layer of a compound containing silver and bismuth, moreover, the problem of electrochemical instability persists because a multilevel discharge pattern can be expected to arise over time owing to the multilayer structure.

The object of the present invention is therefore to obtain an inexpensive unique cathode active material for alkaline electrochemical cells that does not experience discharge characteristic degradation even when the amount of Ag used is reduced further than heretofore.

DISCLOSURE OF THE INVENTION

The present invention provides a cathode active material for alkaline electrochemical cells comprising an Ag—Bi-containing oxidation product produced by oxidizing with an oxidizing agent an Ag—Bi-containing neutralized precipitate obtained by reacting inorganic acid salts of silver and bismuth with an alkali hydroxide in an aqueous medium. This cathode active material, i.e., this oxidation product, consists of particles having crystals of a compound composed of silver, bismuth and oxygen. It consists of particles in which bismuth is present throughout from the surface to the center of the particles. The particles have a composition such that the Ag/Bi mol ratio is in the range of 1–7 and oxygen content is not less than 5 wt %, and the particle diameter is preferably 0.1–10 µm. The cathode active material has a silver content of not greater than 70 wt % and either does not contain the silver compounds $Ag_2O$ and AgO or contains $Ag_2O$ and AgO only at the level of unavoidable impurities.

The present invention further provides, as a still more preferable cathode active material for alkaline electrochemical cells, a cathode active material for alkaline electrochemical cells comprising an Ag—Bi-M-containing oxidation product produced by oxidizing with an oxidizing agent an Ag—Bi-M-containing neutralized precipitate obtained by reacting inorganic acid salts of silver, bismuth and M (M representing at least one metal selected from the group comprised of manganese, nickel and cobalt) with an alkali hydroxide in an aqueous medium. This cathode active material, i.e., this oxidation product, consists of particles having crystals of a compound composed of silver, bismuth, M and oxygen. It consists of particles in which bismuth is present throughout from the surface to the center of the particles. The particles have a composition such that the Ag/(Bi+M) mol ratio is in the range of 1–7 and oxygen content is not less than 5 wt %, and the particle diameter is preferably 0.1–10 µm. The cathode active material preferably has a silver content of not greater than 75 wt % and either does not contain the silver compounds $Ag_2O$ and $AgO$ or contains $Ag_2O$ and $AgO$ only at the level of unavoidable impurities.

The present invention further provides a cathode active material for alkaline electrochemical cells comprising an Ag—Bi-(M)-containing oxidation product obtained by reacting inorganic acid salts of silver and bismuth and, optionally, M (M representing at least one aforesaid metal) with an alkali hydroxide in an aqueous medium and in the presence of an oxidizer.

PREFERRED EMBODIMENTS OF THE INVENTION

In order to solve the foregoing problems, the inventors continued various kinds of experimental research focused on Ag—Bi—O-system compounds. It was found that, in producing a neutralized precipitate by reacting an inorganic acid salt of Ag and an alkali hydroxide in water, when the neutralized precipitate is produced in a state with an inorganic acid salt of Bi and, optionally, an inorganic acid salt of M (M representing at least one of Mn, Co and Ni; hereinafter referred to simply as M), also present, and the precipitate is then subjected to appropriate oxidation treatment, there is obtained a compound suitable as a cathode active material. The cathode active material according the present invention is characterized in that it consists of particles composed of Ag, Bi and O or particles composed of Ag, Bi, M and O, compound crystals are present in the particles, and Bi is dispersed throughout the inner region of the particles.

The compound in the particles is a three-element-system compound of Ag—Bi—O or an Ag—Bi-M-O-system compound. Compound crystals of silver oxide ($Ag_2O$) and silver peroxide (AgO) are preferably not present in the particles and, if present, present at an impurity level of not greater than 1 wt % as Ag.

The three-element-system compound of Ag—Bi—O preferably has a composition such that the Ag/Bi mol ratio (in other words atomic ratio) is 1 to 7, preferably 2 to 5, and the oxygen content is not less than 5 wt %. The Ag content is not greater than 80 wt %, preferably not greater than 75 wt %, more preferably not greater than 70 wt %, and can in some cases be made not greater than 60 wt %. The preferred component ranges are Ag: 45–70 wt %, Bi: 20–40 wt %, O (oxygen): 5–20 wt %, balance: unavoidable impurities. The particle diameter is 0.1–15 μm, preferably 0.2–10 μm. The average particle diameter is in the range of 0.1–10 μm.

The Ag—Bi-M-O-system compound has a composition such that Ag/(Bi+M) mol ratio is 1 to 7, preferably 2 to 5, and the oxygen content is not less than 5 wt %. The Ag content is not greater than 80 wt %, preferably not greater than 70 wt %, and can in some cases be made not greater than 60 wt %. While it suffices for the Bi/M mol ratio to be in the range of not less than 0.1 and less than 100, it is preferably 1 to 10. The preferred component ranges are Ag: 45–75 wt %, Bi: 10–40 wt %, M: 0.5–10 wt %, O (oxygen): 5–15 wt %, and balance: unavoidable impurities. The particle diameter is 0.1–15 μm, preferably 0.2–10 μm. The average particle diameter is in the range of 0.1–10 μm.

When a powder composed of such particles is used as the main material of a cathode active material, it is possible to obtain discharge characteristics comparable to those of a conventional silver oxide electrochemical cell despite the low amount of silver. In addition, since the conductivity of the powder is about three orders of ten higher than that of silver oxide, there is an advantage in the point that the graphite or other conducting material that has had to be added in the case of a silver oxide electrochemical cell is not required.

Therefore, when the particles of the cathode active material according the present invention are compared with those of the aforesaid U.S. Pat. No. 5,389,469 (and the other two cases), it is found that they differ in the point that Bi is dispersed into the particle interior, i.e., throughout the inner region of the particles, in the point that substantially no AgO or $Ag_2O$ crystals are present, in the point that the amount of Ag is small, and so forth. As a result, the cathode active material exhibits unique properties not found in conventional products, with regard to various powder characteristics, discharge characteristics, conductivity characteristic and the like, and, in addition, is inexpensive owing to the small amount of silver.

The cathode active material of the present invention can be obtained by a production process that passes, in order, through the following steps. It should be noted, however, that the neutralization step can be conducted simultaneously with the oxidation step.

(1) Step of reacting "inorganic acid salt of Ag" and "inorganic acid salt of Bi" or "inorganic acid salt of Bi and inorganic acid salt of M" and "alkali hydroxide" in water to obtain a neutralized precipitate (called the "neutralization step), (2) Step of adding oxidizing agent to the obtained neutralized precipitate suspension to oxidize the precipitate (called the "oxidation step"), (3) Step of subjecting the oxidized precipitate suspension to solid-liquid separation to recover solid oxidized precipitate, (4) Step of water-washing and drying the recovered oxidized precipitate, and (5) Step of pulverizing the obtained dry cake into a powder. The above steps will now be explained in order:

[Neutralization Step]

In the neutralization step, a neutralization reaction that produces a precipitate by reacting an inorganic acid salt of Ag and alkali hydroxide in water is carried out with "inorganic acid salt of Bi" or "inorganic acid salt of Bi and inorganic acid salt of M" also present so that a desired amount of "Bi" or "Bi+M" is contained in the precipitate. This treatment carries out a neutralization reaction that produces oxides of Ag, Bi and optionally M by reacting inorganic acid salts of Ag, Bi and optionally M with an alkali hydroxide. The neutralization reaction does not change the valence of the metal ions of the starting material. In other words, the neutralization reaction used in the present invention is not a reaction under reduction condition or under oxidation and therefore does not include a reaction involving metal ion valance change.

Alkali hydroxides usable in the neutralization reaction include sodium hydroxide (NaOH) and potassium hydroxide (KOH). As the "inorganic acid salts of Ag, Bi and optionally M" can be used nitrites, sulfates, hydrochlorides and phosphates of the respective metals. Nitrites or sulfates of the respective metals are preferable, however, and use of the nitrites of the respective metals is typical. For example, a desired number of mols of bismuth nitrite [$Bi(NO_3)_3$] and, optionally, required amounts of manganese nitrite [$Mn(NO_3)_2$], nickel nitrite [$Ni(NO_3)_2$] and/or cobalt nitrite [$Co(NO_3)_2$] are combined with respect to silver nitrite ($AgNO_3$) and reacted with an alkali hydroxide in water.

In the following, for convenience of explanation, the case in which the "inorganic acid salts of Ag, Bi and optionally M" are the "nitrites" of these metals will be taken up as an example.

The neutralization treatment can be performed by any method among the method of adding "powder of Ag, Bi and (M) nitrites" to aqueous solution of alkali hydroxide, the method of mixing aqueous solution of alkali and "aqueous solution of Ag, Bi and (M) nitrites" and the method of adding solid alkali hydroxide to "aqueous solution of Ag, Bi and (M) nitrites." The method of mixing aqueous solution of alkali and "aqueous solution of Ag, Bi and (M) nitrites" is preferable. M is shown in parentheses to indicate that nitrite of M is sometimes not used.

High alkalinity is better in the neutralization treatment. For instance, the reaction proceeds well when the alkali is present at about a ten-fold mol ratio relative to "Ag, Bi and (M)". While the reaction temperature is not particularly limited, a temperature between normal room temperature and 110° C. is preferable. Stirring of an intensity at which the neutralization reaction proceeds uniformly is necessary.

The Ag/Bi atomic ratio in the final compound and, by extension, the Ag/Bi atomic ratio in the particles, can be regulated by varying the Ag/Bi mol ratio of the silver nitrite and bismuth nitrite submitted to the reaction. In the experience of the inventors, the Ag/Bi mol ratio of the silver nitrite and the bismuth nitrite should be adjusted to the range of 1 to 7, preferably 2 to 5. The smaller this mol ratio, the greater is the decrease in the discharge capacity of the cathode active material obtained. However, when the ratio is too large, the amount of Ag becomes great, making it impossible to achieve the object of the invention, which is to reduce the amount Ag used.

When M elements are included, the Ag/(Bi+M) atomic ratio in the final compound and, by extension, the Ag/(Bi+M) atomic ratio in the particles, can be regulated by varying the Ag/(Bi+M) mol ratio in these salts. For the same reason as stated above, the Ag/(Bi+M) mol ratio in those salts should be adjusted to the range of 1 to 7, preferably 2 to 5.

[Oxidation Step]

In the oxidation step, the neutralized precipitate is oxidized using an oxidizing agent. It is a treatment focused on increasing the valence of the Ag, Bi and (M) in the neutralized precipitate. The neutralization step and the oxidation step are preferably conducted separately. It is preferable to insert a step for increasing the temperature of the fluid containing the precipitate between the neutralization step and the oxidation step and to supply the oxidizing agent into the heated fluid. As the oxidizing agent there can be used an ordinary oxidizing agent such as $KMnO_4$, NaOCl, $H_2O_2$, $K_2S_2O_8$, $Na_2S_2O_8$ or ozone or the like.

During the oxidation treatment, the oxidizing agent is preferably added under stirring with the temperature of the fluid maintained at 50° C. or higher, preferably 70° C. or higher. As decomposition of the oxidizing agent proceeds when the temperature is too high, however, a temperature of not higher than 110° C. is preferable. As already noted, the oxidation treatment is a treatment for raising the valence of the Ag and Bi and (M) in the neutralized precipitate, e.g., a treatment for oxidizing $Ag^{+1}$ to $Ag^{+2}$, $Bi^{+3}$ to $Bi^{+3.5}$ or $Bi^{+5}$, $M^{+2}$ to $M^{+3}$, $M^{+3}$ to $M^{+4}$ or the like. The oxidizing agent must be added in an amount sufficient for achieving this valance change. Specifically, the oxidizing agent should be added in an equivalent amount, preferably around twice equivalent amount, with respect to the valence change. The amount of oxidation varies with the valence of the metal elements of the starting material nitrites used in the neutralization treatment and also with the proportional relationship among Ag, Bi and (M), and this variation leads to variation in the component ratios of the Ag—Bi-(M)-O in the product after the oxidation treatment. Carrying out complete oxidation produces an aggregate of fine particles composed entirely of an Ag—Bi—(M)-O-system crystalline compound. As shown in the Examples set out later, the inventors' studies showed that the chance of the presence of AgO, independent oxide of Bi, independent oxide of M and the like, let alone low-valence compounds like $Ag_2O$, in the fine particle aggregate (the Ag—Bi-(M)-containing oxidation product), let alone in the crystalline fine particles, becomes substantially nil, and that Ag—Bi-(M)-O-system crystalline compound suitable as a cathode active material is obtained.

Another possible method is to carry out the oxidation simultaneously with the production of the neutralized precipitate. In this case, it suffices to conduct the neutralization treatment in the presence of the oxidizing agent and to adopt the method of adding the inorganic acid salts of Ag, Bi and (M) and the oxidizing agent simultaneously to aqueous alkali solution or the method of first casting the oxidizing agent into the aqueous alkali solution and then adding the inorganic acid salts of Ag, Bi and (M) to this solution. Even when the neutralization step and the oxidation step are conducted simultaneously as in Example 9 set out later, for example, an Ag—Bi-(M)-containing oxidation product (oxidized precipitate) according the present invention is obtained that is substantially the same as that in the case of conducting the two steps separately.

[Solid-Liquid Separation/Drying/Pulverization Step]

Next, the oxidized precipitate is subjected to solid-liquid separation, washed with water and dried to obtain a black cake. The oxidized precipitate is preferably ripened before conducting the solid-liquid separation. This ripening is a treatment of holding the fluid after the oxidation treatment at its temperature for 20–90 minutes. This ripening treatment enables homogenization of the oxidized precipitate. More specifically, variance in composition among the particles is reduced and a precipitate composed of stable Ag—Bi-(M)—

O-system compound can be obtained. The filtered and washed precipitate is preferably dried at a temperature of 50–200° C. At a temperature higher than 200° C., the produced compound is liable to decompose. The dried cake obtained can be pulverized in a pulverizer to obtain a powder composed of Ag—Bi-(M)-containing oxidation product that is usable as a cathode active material for alkaline electrochemical cells.

As shown later in the Examples, the main peak group of the X-ray pattern of the powder composed of Ag—Bi-(M)-O-system compound obtained by this method does not match those of any compound in the X-ray diffraction data base (ICDD). Moreover, the main peak groups of AgO and $Ag_2O$ do not appear in the X-ray diffraction of the powder. It can therefore be said that neither AgO nor $Ag_2O$ is present as a compound in the powder. Even if present, they are present as impurities and the total amount of these impurities, including both AgO and $Ag_2O$, is at most not more than 1 wt %, preferably not more than 0.5 wt %, still more preferably an amount below the detection limit of X-ray diffraction. The present invention therefore provides an Ag—Bi-(M)-O-system compound of heretofore unknown crystal structure and composition and the reaction that produces this material in the foregoing method is considered to be a new reaction.

The inventors believe that the reaction that produces the compound in accordance with the present invention is one based on the reaction formulas set out below. It should be noted, however, that the inorganic acid salts of Ag, Bi and (M) used in the neutralization reaction are assumed to be silver nitrite ($AgNO_3$), bismuth nitrite [$Bi(NO_3)_3$] and nickel nitrite [$Ni(NO_3)_2$], the alkali hydroxide to be sodium hydroxide (NaOH), and the oxidizing agent to be sodium peroxodisulfate ($Na_2S_2O_8$).

Neutralization Reaction (No Oxidation-Reduction Reaction Present)

(1) Ag—Bi—O-system neutralization reaction formula ($1 \leq X \leq 7$)

(2) Ag—Bi-M-O-system neutralization reaction formula ($1 \leq X \leq 7$, $0.1 \leq Y \leq 0.99$.)

Oxidation Reaction

(1) Ag—Bi—O-system oxidation reaction formula

[Ag(1)→Ag(1.8) and Bi(3)→Bi(3.5) oxidation reaction]

(2) Ag—Bi-M-O-system oxidation reaction formula

[Ag(1)→Ag(1.25), Bi(3)→Bi(3.5) and Ni(2)→Ni(3) oxidation reaction]

The cathode active material of the present invention will now be explained further with reference to the results of typical tests conducted by the inventors.

EXAMPLES

Example 1

Silver nitrite ($AgNO_3$) and bismuth nitrite [$Bi(NO_3)_3$] were weighed to obtain an Ag/Bi mol ratio of 3. The silver nitrite and bismuth nitrite were added under stirring to an aqueous solution (1.5 liter) containing 10 mol of dissolved NaOH per mol of the two nitrites combined, thereby producing a neutralized precipitate in the solution. The neutralized precipitate suspension obtained was heated to 90° C. and subjected to oxidation treatment by, under stirring, adding potassium peroxodisulfate ($K_2S_2O_8$) as oxidizing agent to the suspension at the rate of one mol per mol of Ag and Bi combined. Upon completion of the oxidation treatment, the oxidized precipitate was ripened by holding it at a temperature of 104° C. for 60 minutes, the precipitate was recovered by filtering, washed with water and dried at 100° C. to obtain a dried product that was pulverized with a pulverizer.

The powder properties of the obtained powder were examined. It had a specific surface area by the BET method of 1.256 $m^2/g$, tap density of 1.72 g/cc, a compressed density of 6.01 $g/cm^3$, and a $D^{50}$ measured with a helos particle-size distribution measuring device of 6.53 $\mu m$. $D^{50}$ measured with a helos particle-size distribution measuring device is determined using a cumulated particle diameter curve plotted in an orthogonal coordinate system whose horizontal axis is scaled for particle diameter D ($\mu m$) and whose vertical axis is scaled volume of particles of not greater than D $\mu m$ present (Q) % and is the value of particle diameter D ($\mu m$) corresponding to Q=50%.

Chemical analysis of the composition of the obtained powder showed it to comprise 54.4 wt % of Ag, 34.8 wt % of Bi and 9.9 wt % of O. The conductivity of the powder was measured using the same method as used in the case of measuring the conductivity of silver oxide ($Ag_2O$) powder as a cathode active material for alkaline electrochemical cells and was found to be $1.53$ S/cm$\times 10^{-2}$. In comparison, the conductivity of silver oxide powder is about $4.8$ S/cm$\times 10^{-5}$.

Figure 1:
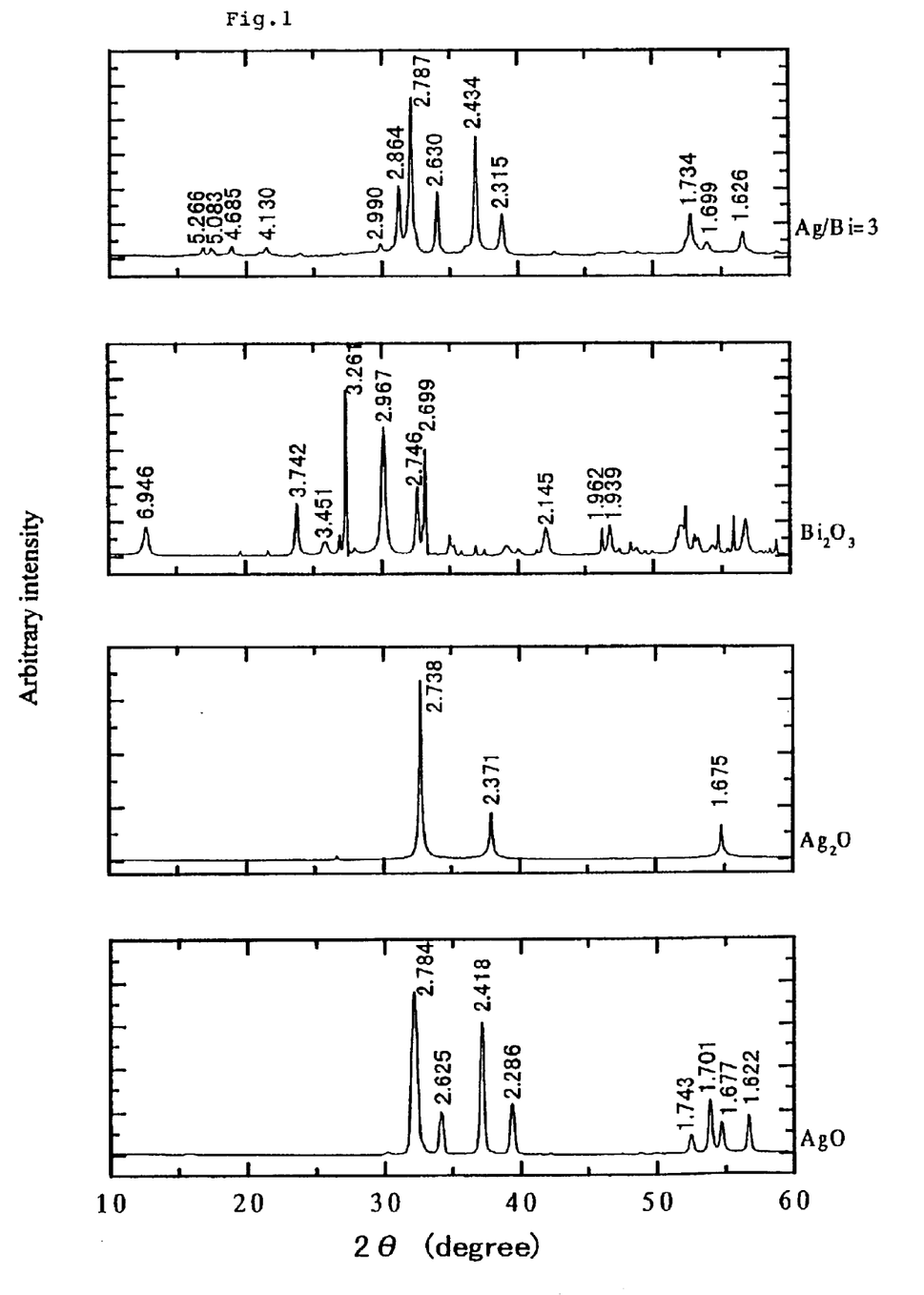
FIG. 1 shows the X-ray diffraction chart of a cathode active material according to the present invention in comparison with those of other powders.

The X-ray diffraction chart of the obtained powder is indicated at the top of FIG. 1 (chart designated Ag/Bi=3). For reference, FIG. 1 also shows the X-ray diffraction charts for each of $Bi_2O_3$, $Ag_2O$ and AgO below the chart just mentioned. As can be seen in FIG. 1, the powder particles of this Example are clearly composed of crystals having many peaks but, differently from those of $Bi_2O_3$, $Ag_2O$ and AgO, have numerous new peaks as a compound composed of the three elements Ag, Bi and O.

Next, the discharge characteristics of the powder when used as a cathode active material were examined under the same conditions as a silver oxide ($Ag_2O$) powder marketed commercially as a cathode active material having substantially the same compressed density (6.6 $g/cm^3$). It was found that the powder had an initial potential of 1.758 V (1.647 V for $Ag_2O$), a weight-energy density of 205 mAh/g (204 mAh/g for $Ag_2O$), and a volume-energy density of 1,232 mAh/$cm^3$ (1,285 mAh/$cm^3$ for $Ag_2O$). It was thus ascertained that the powder obtained in this Example had discharge characteristics comparable to silver oxide ($Ag_2O$) commercially marketed as a cathode active material.

Example 2

In the neutralization step, silver nitrite ($AgNO_3$), bismuth nitrite [$Bi(NO_3)_3$] and nickel nitrite [$Ni(NO_3)_2 \cdot 6H_2O$] were weighed to obtain an Ag/(Bi+Ni) mol ratio of 3 and a Bi/Ni mol ratio of 1, an aqueous solution containing the dissolved nitrites was prepared, and an aqueous solution (1.5 liter) containing 10 mol of dissolved sodium hydroxide per mol of (Ag+Bi+Ni) was added thereto at 50° C. under stirring to obtain a neutralized precipitate. The neutralized precipitate suspension obtained was heated to 90° C. and subjected to oxidation treatment by adding potassium peroxodisulfate ($K_2S_2O_8$) as oxidizing agent to the suspension at the rate of two mols per mol of (Ag+Bi+Ni). Upon completion of the oxidation treatment, the oxidized precipitate was ripened by holding it at a temperature of 90° C. for 30 minutes, the precipitate was recovered by filtering, washed with water and dried at 100° C. to obtain a dried product that was pulverized into a powder with a pulverizer.

Analysis of the composition of the obtained powder gave the following results:

Ag=63.5 wt %
Bi=18.5 wt %
Ni=6.2 wt %
O=11.1 wt %
Total=99.3 wt %.

The specific surface area of the powder by the BET method was 18.8 $m^2/g$ and the compressed density thereof was 6.30 $g/cm^3$. The primary particle diameter of the powder observed from a SEM image was distributed in the range of 0.1–10 $\mu$m.

Figure 2:
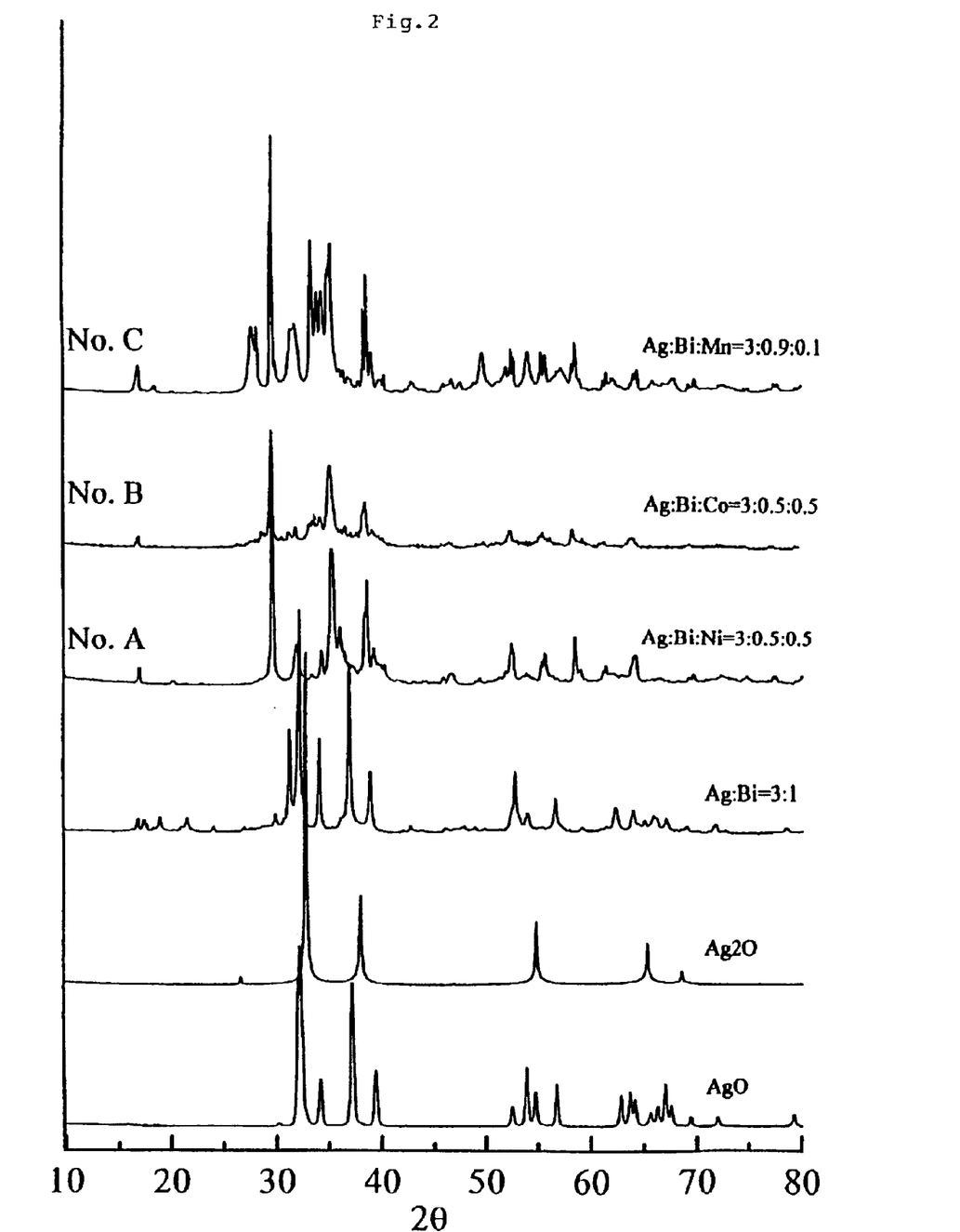
FIG. 2 shows the X-ray diffraction charts (target: Cu; the same hereinafter) of other cathode active materials according to the present invention in comparison with those of other powders.

The powder was subjected to powder X-ray diffraction. The diagram No. A in FIG. 2 was obtained. The X-ray diffraction charts of AgO and $Ag_2O$ are also shown in FIG. 2. It can be seen that the peaks of AgO and $Ag_2O$ differ from the powder peaks of No. A. The X-ray diffraction chart designated Ag:Bi=3:1 in FIG. 2 is the powder of Example 1.

The conductivity of the powder was measured using the same method as used in the case of measuring the conductivity of silver oxide ($Ag_2O$) powder as a cathode active material and was found to be $8.2 \times 10^0$ S/cm (the conductivity of silver oxide powder is about $4.8 \times 10^{-5}$ S/cm). The open-circuit voltage of the powder when used as a cathode active material was examined under the same conditions as a silver oxide ($Ag_2O$) powder marketed commercially as a cathode active material having substantially the same compressed density (6.6 $g/cm^3$). The open-circuit voltage was determined by measuring the voltage after the cell had been allowed to stand for 1 hour at 25° C. following fabrication. The powder was found to have an open-circuit voltage of 1.735 V, while that of $Ag_2O$ powder was 1.647 V.

Thus, notwithstanding that the powder obtained in this example had a low silver content of 63.5%, it exhibited good open-circuit voltage characteristic as a cathode active material. It can therefore be seen that an inexpensive cathode active material fully capable of replacing silver oxide was obtained. Moreover, since the powder had a high compressed density of 6.30 $g/cm^2$, an adequate amount of active material chargeable into a unit volume can be secured, which is advantageous from the aspect of increasing cell volume-energy density. Since the peak group of the powder in the X-ray diffraction results does not match any compound in the X-ray data base (ICDD), the powder is believed to consist of a new compound crystal. That is, the cathode active material can be viewed as a new substance having crystals of a compound composed of a combination of the four elements Ag, Bi, Ni and O in its particles.

Example 3

Example 2 was repeated except that the mixing ratios of silver nitrite, bismuth nitrite and nickel nitrite used in the neutralization step were varied to obtain the Ag:Bi:Ni mol ratios shown in Table 1 and thus produce the corresponding Ag—Bi—Ni—O-system powders. The powders were chemically analyzed to determine their compositions. The results are shown in Table 1. Powder No. 3 in Table 1 is that obtained in Example 2 above.

Further, Example 2 was repeated except that in the neutralization step cobalt nitrite [$Co(NO_3)_2 \cdot 6H_2O$] was used in place of nickel nitrite and the mixing ratios of silver nitrite, bismuth nitrite and cobalt nitrite were varied to obtain the Ag:Bi:Co mol ratios shown in Table 1 and thus produce the corresponding Ag—Bi—Co—O-system powders. The composition of each determined by chemical analysis is also shown in Table 1.

TABLE 1

| No. | Mol ratio | Type of M | Result of chemical analysis (content of each element in powder): wt % | | | | |
|---|---|---|---|---|---|---|---|
| | | | Ag | Bi | M | O | Total |
| 1 | Ag:Bi:M | | | | | | |
| 2 | 4:0.6:0.4 | Ni | 66.9 | 18.6 | 3.7 | 9.8 | 99.0 |
| 3 | 4:0.8:0.2 | Ni | 64.4 | 23.4 | 1.8 | 9.5 | 99.1 |
| 4 | 3:0.5:0.5 | Ni | 63.5 | 18.5 | 6.2 | 11.1 | 99.3 |
| 4 | 3:0.6:0.4 | Ni | 62.4 | 21.5 | 4.6 | 10.6 | 99.1 |
| 5 | 3:0.5:0.5 | Co | 60.6 | 21.1 | 5.6 | 11.3 | 98.6 |
| 6 | 3:0.9:0.1 | Co | 55.7 | 31.9 | 1.4 | 10.1 | 99.1 |

Example 4

Example 2 was repeated except that the mixing ratios of silver nitrite, bismuth nitrite and nickel nitrite used in the neutralization step were varied to obtain the Ag:Bi:Ni mol ratios shown in Table 2 and thus produce the corresponding Ag—Bi—Ni—O-system powders. The measured compressed densities of the powders are shown in Table 2. In order to elucidate the effect of the Ag/(Bi+Ni) ratio and Bi/Ni ratio of the mixtures used to obtain the powders, the compressed density values ($g/cm^3$) are shown with reference to the both ratios in Table 2. The compressed densities of the Ag—Bi—O-system powders of Example 1 (without Ni addition) are also shown in the "No Ni added" column of Table 2.

It can be seen from Table 2 that compressed density tends to increase with Ni addition.

TABLE 2

| Powder composition (mol ratio) and compressed density ($g/cm^3$) | | Bi/Ni | | | | | No Ni added |
|---|---|---|---|---|---|---|---|
| | | 0.5/0.5 | 0.6/0.4 | 0.7/0.3 | 0.8/0.2 | 0.9/0.1 | 1.0/0 |
| Ag/(Bi + Ni) | 4/1 | | 6.28 | | 6.37 | | 5.99 |
| | 3/1 | 6.30 | 6.15 | 6.28 | 6.33 | 6.33 | 6.01 |
| | 2.5/1 | 6.16 | 6.16 | 6.20 | 6.10 | 6.00 | |
| | 2/1 | 5.98 | 6.13 | 6.09 | 5.98 | 6.20 | 6.14 |

Example 5

Example 2 was repeated except that the mixing ratios of silver nitrite, bismuth nitrite and nickel nitrite used in the neutralization step were varied to obtain the Ag:Bi:Ni mol ratios shown in Table 3 and thus produce the corresponding Ag—Bi—Ni—O-system powders. The specific surface areas of the powders were measured by the BET method and the values ($m^2/g$) are shown in Table 3 in accordance with the same method of indication as in Table 2. The specific surface areas of the Ag—Bi—O-system powders of Example 1 (without Ni addition) are also shown in the "No added Ni" column of Table 3.

It can be seen from Table 3 that specific surface area tends to increase with Ni addition.

TABLE 3

| Powder composition (mol ratio) and specific surface area ($m^2/g$) | | Bi/Ni | | | | No Ni added |
|---|---|---|---|---|---|---|
| | | 0.5/0.5 | 0.6/0.4 | 0.7/0.3 | 0.8/0.2 | 0.9/0.1 | 1.0/0 |
| Ag/(Bi + Ni) | 4/1 | | | | | | 1.79 |
| | 3/1 | | | | 9.86 | 4.54 | 5.74 |
| | 2.5/1 | 24.69 | 20.98 | 14.44 | 9.39 | 7.69 | |
| | 2/1 | | | | | | 4.96 |

Example 6

Example 2 was repeated except that the mixing ratios of silver nitrite, bismuth nitrite and nickel nitrite used in the neutralization step were varied to obtain the Ag:Bi:Ni mol ratios shown in Table 4 and thus produce the corresponding Ag—Bi—Ni—O-system powders. The open-circuit voltages of the powders when used as cathode active material were measured under the same conditions as a silver oxide ($Ag_2O$) powder marketed commercially as a cathode active material (the $Ag_2O$ open-circuit voltage was 1.647 V) and the results are shown in Table 4 in accordance with the same method of indication as in Tables 2 and 3. The open-circuit voltage the powders of Example 1 (without Ni addition) are also shown in Table 4.

It can be seen from Table 4 that a lower open-circuit voltage is obtained in the case of using an Ag—Bi—Ni—O-system powder in accordance with the present invention as a cathode active material than in the case of using an Ag—Bi—O-system powder not added with Ni.

TABLE 4

| Powder composition (mol ratio) and open-circuit voltage (V) | | Bi/Ni | | | | | No Ni added |
|---|---|---|---|---|---|---|---|
| | | 0.5/0.5 | 0.6/0.4 | 0.7/0.3 | 0.8/0.2 | 0.9/0.1 | 1.0/0 |
| Ag/(Bi + Ni) | 4/1 | | 1.701 | | 1.729 | | 1.806 |
| | 3/1 | 1.735 | 1.734 | 1.732 | 1.715 | 1.691 | 1.758 |
| | 2.5/1 | 1.746 | 1.755 | 1.744 | 1.732 | 1.692 | |
| | 2/1 | 1.751 | 1.746 | 1.754 | 1.693 | 1.762 | 1.775 |

Example 7

Example 2 was repeated except that in the neutralization step cobalt nitrite [$Co(NO_3)_2 \cdot 6H_2O$] was used in place of nickel nitrite and the mixing ratios of silver nitrite, bismuth nitrite and cobalt nitrite were varied to obtain the Ag:Bi:Co mol ratios shown in Table 5 and thus produce the corresponding Ag—Bi—Co—O-system powders. The open-circuit voltages of the powders when used as cathode active material were measured in the same manner as in Example 6 and the results are shown in Table 5.

The open-circuit voltages of powders obtained by repeating Example 2 except for using manganese nitrite [$Mn(NO_3)_2$] were also similarly measured. The results are shown in Table 5.

TABLE 5

| Powder composition (mol ratio) and open-circuit voltage (V) | | Bi/Co or Bi/Mn | | |
|---|---|---|---|---|
| | | 0.5/0.5 | 0.9/0.1 | 0.95/0.05 |
| Ag/(Bi + Co) | 3/1 | 1.616 | 1.662 | 1.742 |
| Ag/(Bi + Mn) | 3/1 | | 1.742 | 1.742 |

Of the powders in Table 5, the one in which Ag/(Bi+Co)= 3/1 and Bi/Co=0.95/0.05 and the one in which Ag/(Bi+Mn)= 3/1 and Bi/Mn=0.9/0.1 were subjected to X-ray diffraction. The X-ray charts of diagrams No. B and No. C in FIG. 2 were obtained. Like the No. A powder, these powders also had no peaks of the compounds $Ag_2O$, $AgO$ and $Bi_2O_3$. That is, these powders can also be viewed as a new substances having crystals of a compound composed of a combination of the four elements Ag, Bi, M and O in its particles.

Table 6 shows conductivities of several types of powders of the preceding Examples shown in comparison with that of $Ag_2O$. It can be seen from the results in Table 6 that the powders according to the present invention have conductivities that are three or five orders of ten higher than $Ag_2O$.

TABLE 6

| Powder composition (mol ratio) and and conductivity (S/cm) | | Bi/M (M being Ni, Co or Mn) | |
|---|---|---|---|
| | | 0.5/0.5 | 0.9/0.1 |
| Ag/(Bi + Ni) | 3/1 | $8.2 \times 10^0$ | $1.5 \times 10^0$ |
| Ag/(Bi + Co) | 3/1 | $5.5 \times 10^{-2}$ | $1.7 \times 10^{-1}$ |
| Ag/(Bi + Mn) | 3/1 | — | $4.3 \times 10^{-2}$ |
| $Ag_2O$ | — | | $4.8 \times 10^{-5}$ |

Example 8

In the neutralization step, silver nitrite ($AgNO_3$), bismuth nitrite [$Bi(NO_3)_3$] and nickel nitrite [$Ni(NO_3)_2 \cdot 6H_2O$] were weighed to obtain the Ag/(Bi+Ni) mol ratios shown in Tables 7 and 8 and were dissolved in 0.8 liter of water. Separately, a 50° C. aqueous alkali solution (1.6 liter) containing NaOH adjusted to a mol concentration of 1 mol/liter was prepared. The aqueous solution containing the dissolved salts and a 48% NaOH aqueous solution were simultaneously added to the 50° C. aqueous alkali solution to obtain a neutralized precipitate. At this time, the amount of the 48% NaOH aqueous solution added was adjusted to constantly maintain a NaOH concentration of 1 mol/liter in the tank even when the amount of NaOH required to neutralize the $NO_3^-$ ions increased by addition of the salts was subtracted from the total amount of NaOH initially present in the tank. The neutralized precipitate suspension obtained was heated to 90° C. and subjected to oxidation treatment by adding sodium peroxodisulfate ($Na_2S_2O_8$) as oxidizing agent to the suspension at the rate of one mol per mol of (Ag+Bi+Ni). Upon completion of the oxidation treatment, the oxidized precipitate was ripened by holding it at a temperature of 90° C. for 30 minutes, the precipitate was recovered by filtering, washed with water and dried at 100° C. to obtain a dried product that was pulverized into a powder with a pulverizer. The discharge characteristics (open-circuit voltage) of each powder when used as a cathode active material were measured under the same conditions as in Example 2 and the measured values obtained for the powders are shown in Table 7. Further, the measured discharge capacities (at 1.4 V) of the powders are shown in Table 8.

Figure 3:
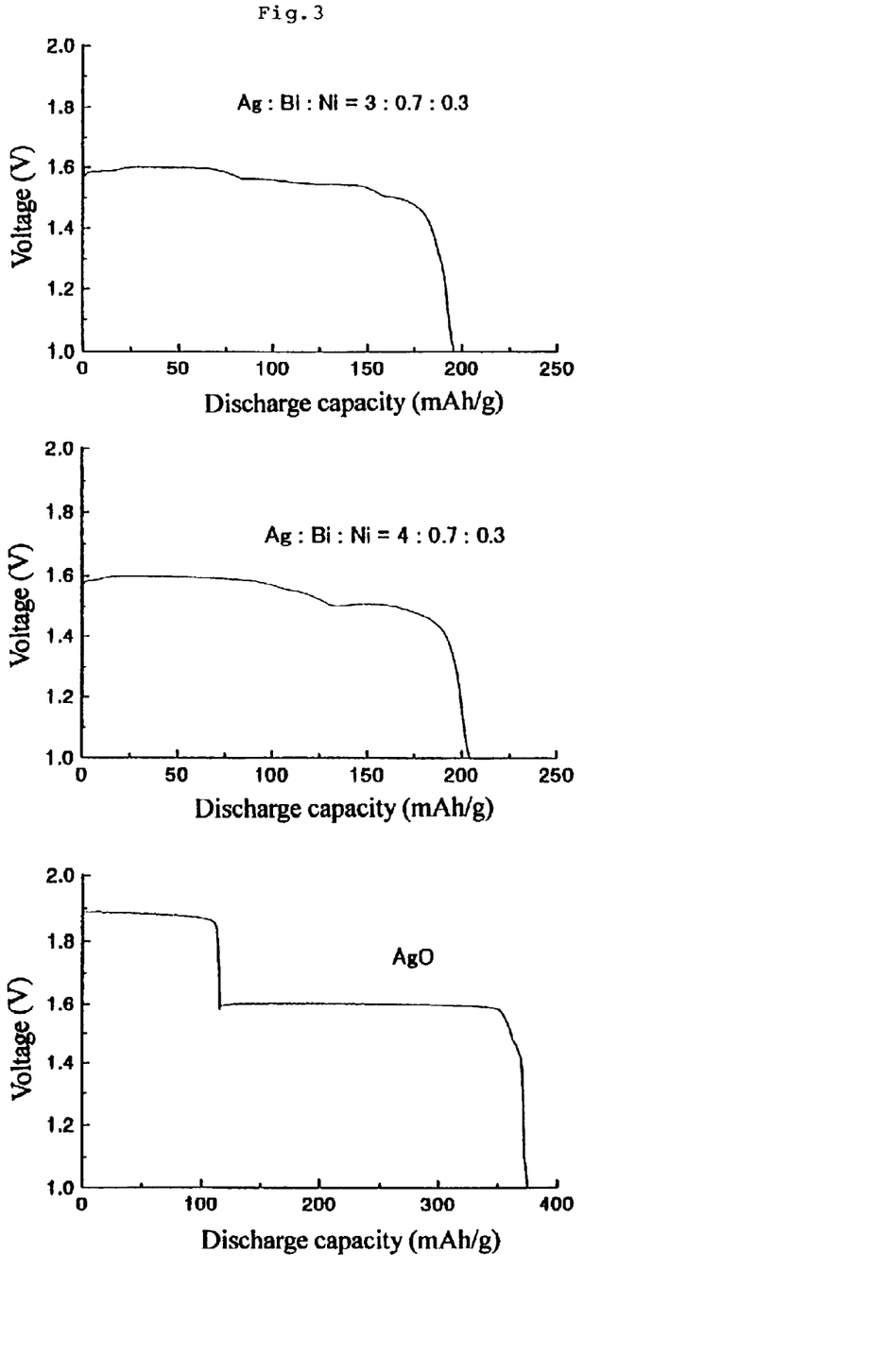
FIG. 3 shows the discharge curves of cathode active materials in accordance with the present invention in comparison with that of AgO.

In addition, FIG. 3 shows the discharge curves of the powder in which Ag/(Bi+Ni)=3/1 and Bi/Ni=0.7/0.3 (i.e., the Ag:Bi:Ni=3:0.7:0.3 powder) and the Ag:Bi:Ni=4:0.7:0.3 powder selected as typical of the powders obtained in this example. The discharge curve of AgO is shown in FIG. 3 for comparison.

As can be seen from Tables 7 and 8 and FIG. 3, the Ag—Bi—Ni—O-system powders according to the present invention exhibit good open-circuit voltages and discharge capacities when used as cathode active materials.

TABLE 7

| Powder composition (mol ratio) and open-circuit voltage (V) | | Bi/Ni | | | |
|---|---|---|---|---|---|
| | | 0.5/0.5 | 0.6/0.4 | 0.7/0.3 | 0.8/0.2 |
| Ag/(Bi + Ni) | 6/1 | | | 1.635 | 1.633 |
| | 5/1 | | | 1.615 | 1.692 |
| | 4/1 | | 1.594 | 1.600 | 1.760 |
| | 3/1 | 1.603 | 1.613 | 1.682 | 1.765 |
| | 2.5/1 | 1.611 | | | |

TABLE 8

| Powder composition (mol ratio) and discharge capacity (mAh/g) | | Bi/Ni | | | |
|---|---|---|---|---|---|
| | | 0.5/0.5 | 0.6/0.4 | 0.7/0.3 | 0.8/0.2 |
| Ag/(Bi + Ni) | 6/1 | | | 198 | 201 |
| | 5/1 | | | 204 | 202 |
| | 4/1 | | 195 | 189 | 197 |
| | 3/1 | 192 | 188 | 189 | 188 |
| | 2.5/1 | 186 | | | |

Figure 4:
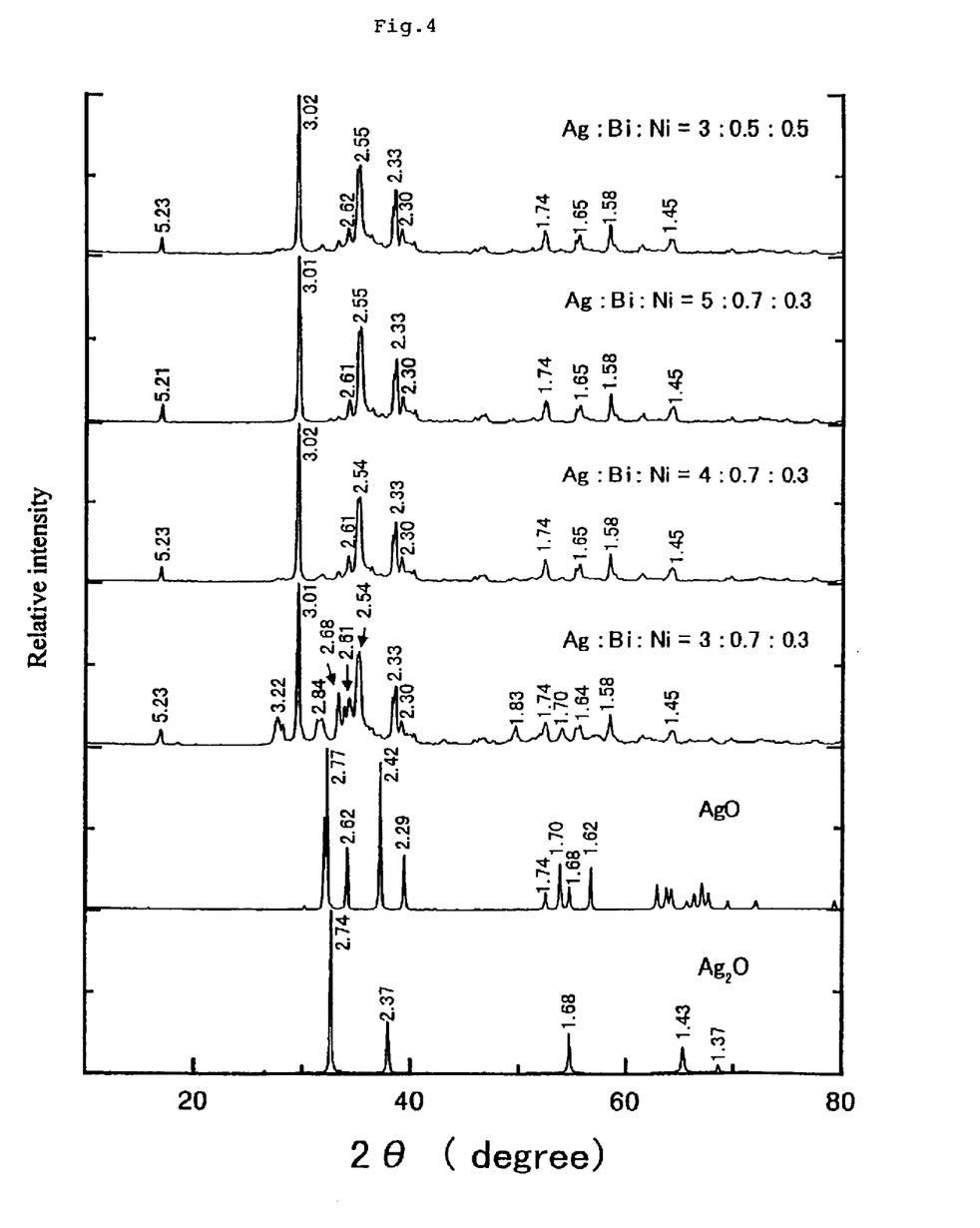
FIG. 4 shows the X-ray diffraction charts of cathode active materials according to the present invention in comparison with those of other powders.
Figure 5:
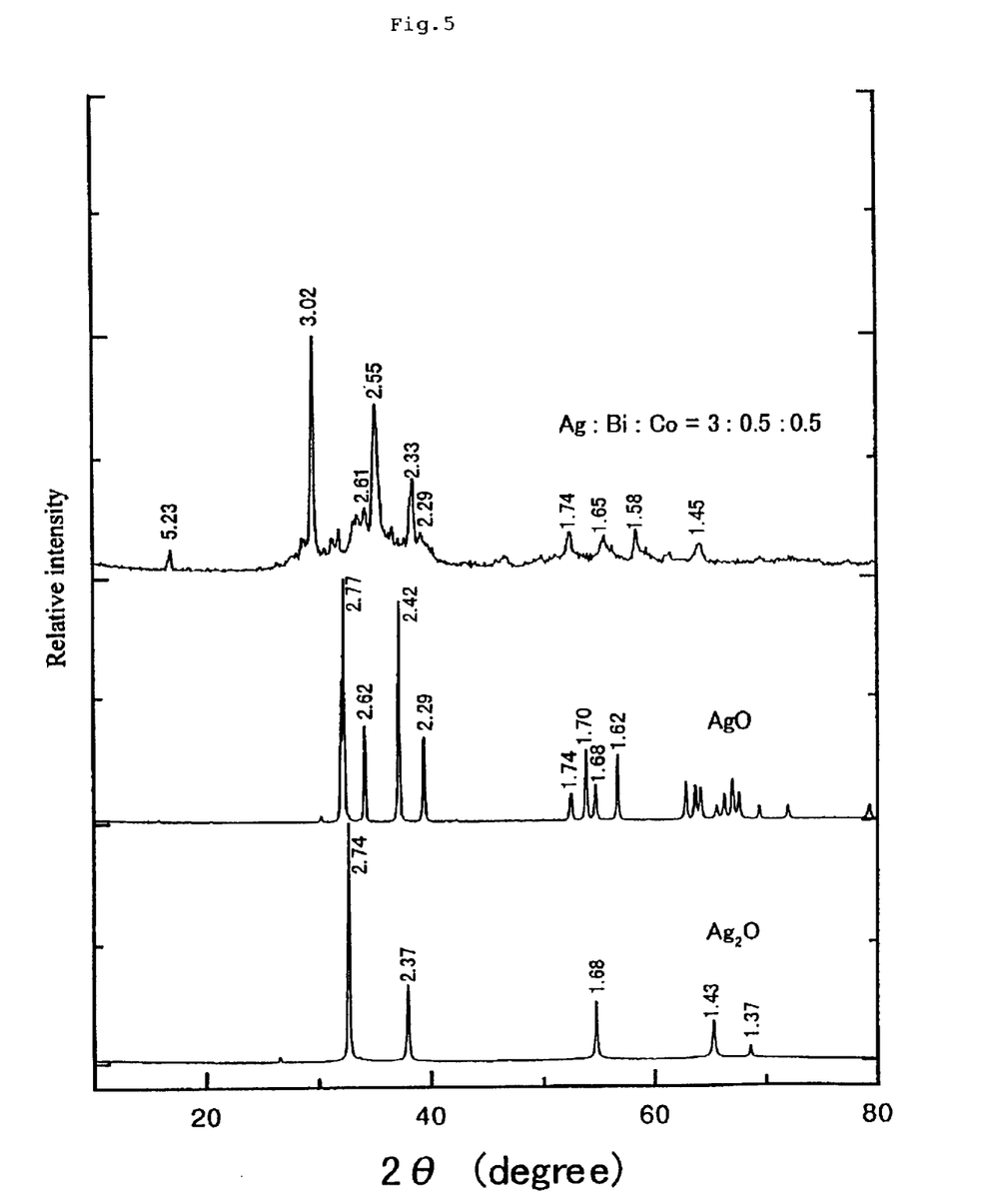
FIG. 5 shows an enlargement of the X-ray diffraction chart of cathode active material No. B of FIG. 2 together with the values of relative intensity of the respective peaks.

Further, FIG. 4 shows the X-ray diffraction results for the Ag:Bi:Ni=3:0.5:0.5 powder, the Ag:Bi:Ni=5:0.7:0.3 powder, the Ag:Bi:Ni=4:0.7:0.3 powder and the Ag:Bi:Ni=3:0.7:0.3 powder selected as typical of the powders obtained in this example. The X-ray diffraction results for AgO powder and $Ag_2O$ powder are also is shown in FIG. 4 for comparison. From the results in FIG. 4, it can be seen that these powders of this Example are compounds having crystal structures different from those of AgO and $Ag_2O$ and that, while slight shifts owing the amounts of Bi and Ni incorporated can be seen, the powders have similar crystal structures with common main peaks. No Ag—Bi—Ni—O-system compound having such peaks was known heretofore. FIG. 5 shows an enlargement of the X-ray diffraction results for the No. B powder of FIG. 2 (Ag:Bi:Co=3:0.5:05 powder), together with the peak coefficients (lattice spacing: in Å). As is clear from a comparison of FIGS. 5 and 4, the main peaks of M are common between Ni and Co and it can be seen that the two have similar crystal structures.

Figure 6:
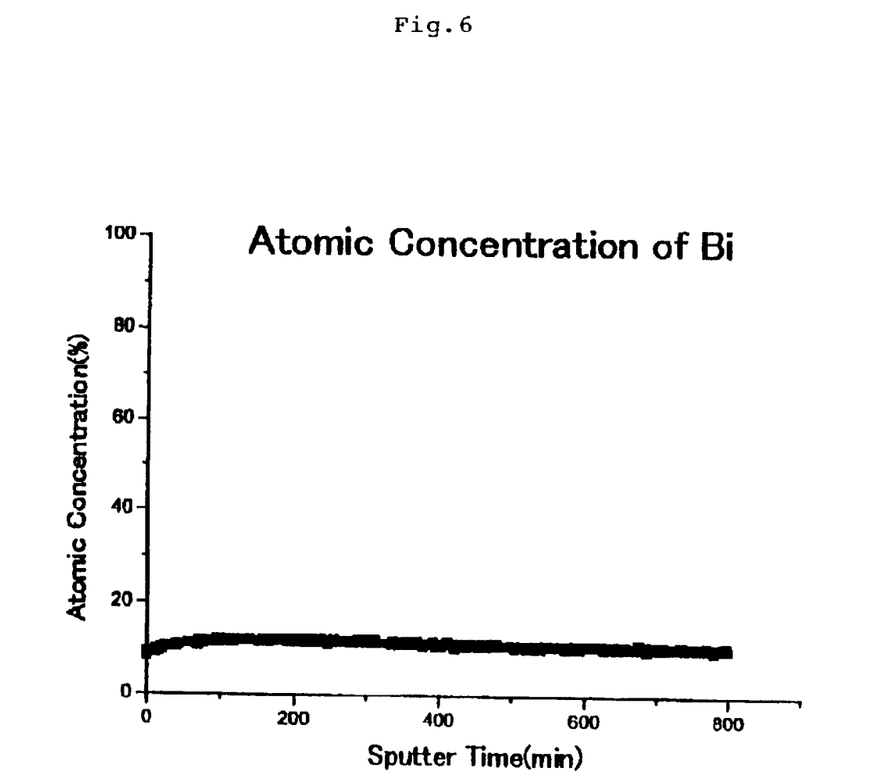
FIG. 6 is a graph showing the Bi concentration distribution of particles of a cathode active material according to the present invention obtained by ESCA measurement.

Next, a small amount of particles (average particle diameter of 0.6 µm) sampled from the Ag:Bi:Ni=3:0.7:0.3 powder selected as typical of the powders obtained in this Example was analyzed for Bi concentration distribution using ESCA (electron spectroscopy for chemical analysis). An ULVAC-PHI, Inc. 5800 analyzer was used, the X-ray source was an Al anode beam source (300 V), and the depth etching velocity from the particle surface was 0.32 nm/min. The results of the analysis are shown in FIG. 6. The horizontal axis in FIG. 6 is scaled for sputter time and the vertical axis for Bi atomic concentration (%). The etching was conducted for about 800 minutes (sputter time: approx 800 min). Calculated from the etching velocity, this amounts to a depth of about 0.25 µm, meaning the 0.6 µm-diameter particle was etched substantially to its center. The result in FIG. 6 shows that the Bi concentration in the particle varied almost not at all and maintained a substantially constant value from the particle surface to a sputter time of 800 min.

Example 9

This Example shows cathode active materials of the present invention obtained by effecting neutralization and oxidation simultaneously.

Silver nitrite ($AgNO_3$), bismuth nitrite [$Bi(NO_3)_3$] and nickel nitrite [$Ni(NO_3)_2 \cdot 6H_2O$] were weighed to obtain the Ag/(Bi+Ni) mol ratios shown in Tables 9 and 10 and were dissolved in 0.8 liter of water. It should be noted, however, that Bi/Ni=1.0/0 in Tables 9 and 10 indicates that only Ag nitrite and bismuth nitrite were dissolved at the indicated rates, with no addition of nickel nitrite.

Separately, an amount of potassium peroxodisulfate ($K_2S_2O_8$) equivalent to one mol per mol of the aforesaid nitrites was weighed and dissolved to obtain 1.4 liter of aqueous solution.

To 1.6 liter of a solution prepared to contain dissolved NaOH at 5 mols per mol of the total amount of the nitrites were added the aqueous solution of nitrites and the aqueous solution of potassium peroxodisulfate, simultaneously over a period of thirty minutes with the solution temperature maintained at 104° C.

Upon completion of the addition, the solution was ripened by holding it at a temperature of 104° C. for 30 minutes, the precipitate was recovered from the solution by filtering, washed with water and dried at 100° C. to obtain a dried product that was pulverized with a pulverizer.

The open-circuit voltage and discharge capacity (at 1.4 V) of each powder obtained when used as a cathode active material were measured under the same conditions as in Example 2. The results are shown in Tables 9 and 10.

Figure 7:
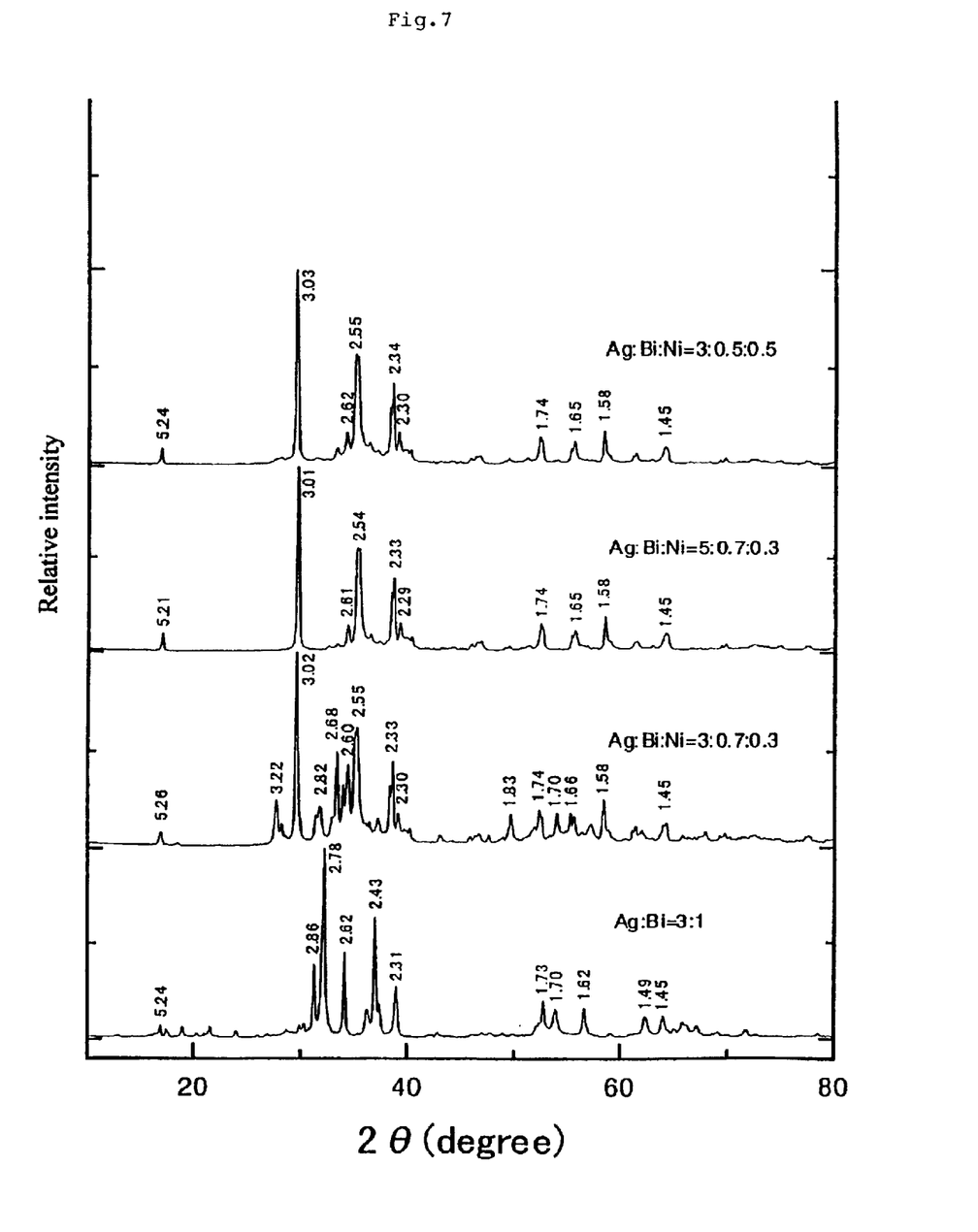
FIG. 7 shows the X-ray diffraction charts of other cathode active materials according to the present invention.

The X-ray diffraction results for the obtained powders (four types) are shown in FIG. 7. It can be seen from the results in FIG. 7 that the Ag:Bi:Ni=5:0.7:0.3 powder, =3:0.7:0.3 powder and =3:0.5:0.5 powder obtained in this Example all had X-ray patterns resembling those of FIG. 4 obtained in Example 8, while the Ag:Bi=3:1 powder of this Example had an X-ray pattern resembling that in FIG. 1 obtained in Example 1. It will be understood that powders having the same crystal structures can be obtained both when neutralization and oxidation are conducted simultaneously and when they are conducted separately.

TABLE 9

| Powder composition (mol ratio) and open-circuit voltage (V) | | Bi/Ni | | |
|---|---|---|---|---|
| | | 0.5/0.5 | 0.7/0.3 | 1.0/0 |
| Ag/(Bi + NI) | 5/1 | | 1.596 | |
| | 3/1 | 1.608 | 1.619 | 1.778 |

TABLE 10

| Powder composition (mol ratio) and discharge capacity (mAh/g) | | Bi/Ni | | |
|---|---|---|---|---|
| | | 0.5/0.5 | 0.7/0.3 | 1.0/0 |
| Ag/(Bi + NI) | 5/1 | | 202 | |
| | 3/1 | 183 | 177 | 197 |

Figure 8:
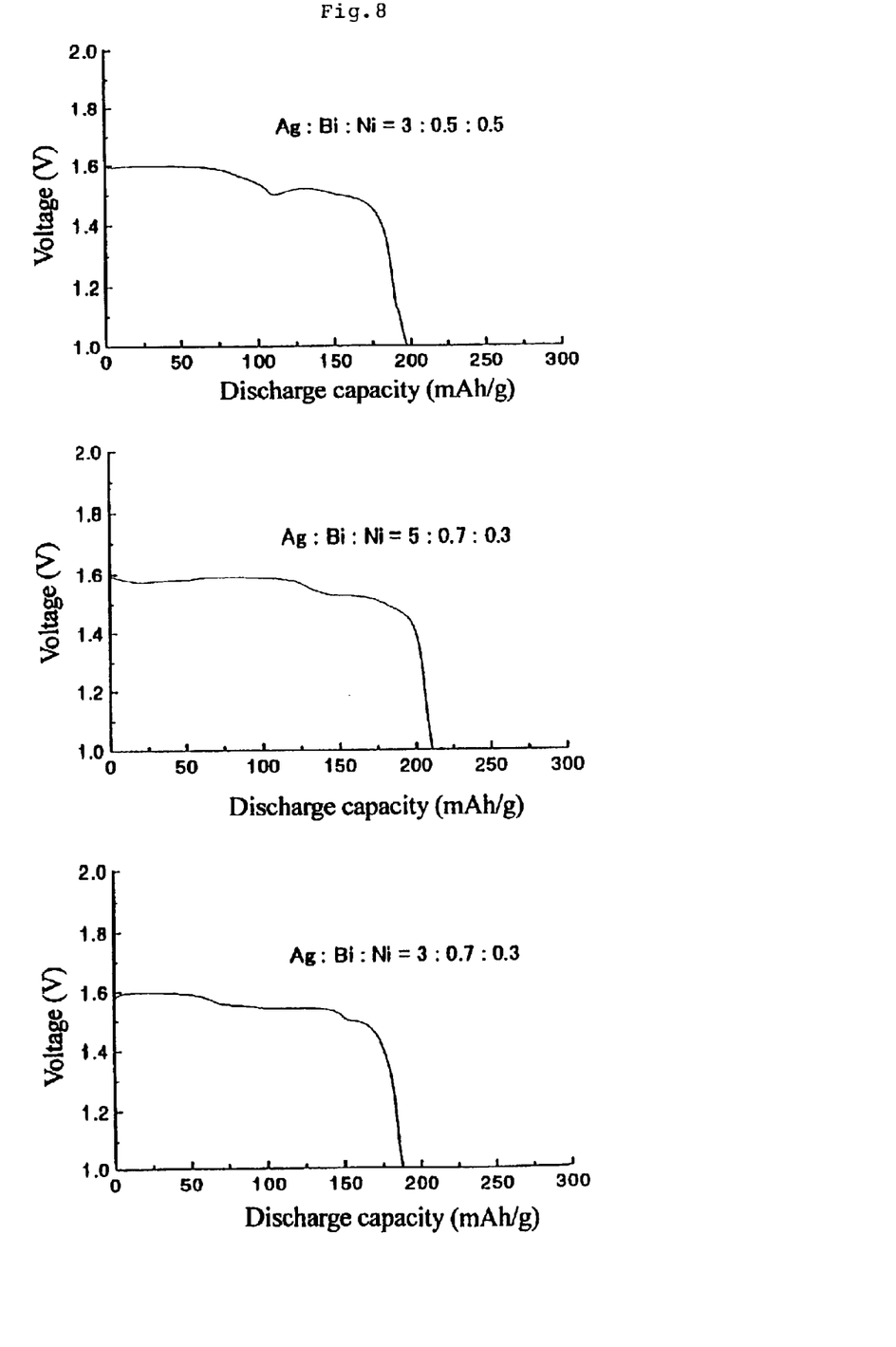
FIG. 8 shows examples of the discharge curves of cathode active materials according to the present invention.

In addition, the discharge curves the Ag:Bi:Ni=5:0.7:0.3 powder, =3:0.7:0.3 powder and =3:0.5:0.5 powder obtained in this Example are shown in FIG. 8. As can be seen from Tables 9 and 10 and FIG. 8, the Ag—Bi-(M)-O-system powders obtained in this Example have good cell characteristics when used as cathode active materials.

Example 10

This Example shows X-ray diffraction results for powders varied in Ag/Bi mol ratio.

Figure 9:
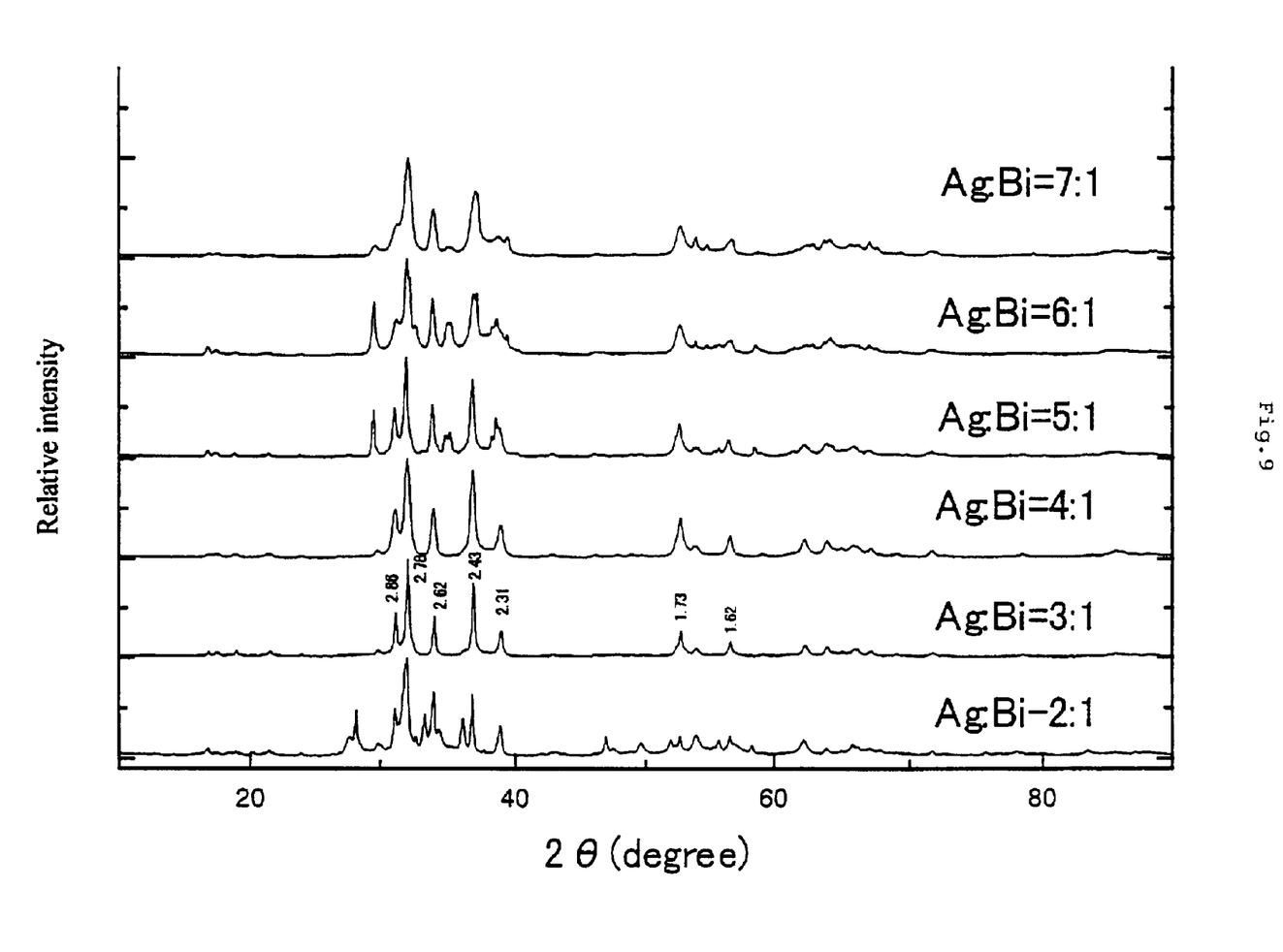
FIG. 9 shows a comparison of the X-ray diffraction results for several cathode active materials according the present invention.

Example 1 was repeated except that the Ag/Bi mol ratio was changed to 7/1, 6/1, 5/1, 4/1 and 2/1. The X-ray diffraction results of the powders obtained are shown together with that of powder of Example 1 in FIG. 9. I will be understood from FIG. 9 that the main peaks of all powders with changed Ag/Bi ratios substantially coincide, and that, therefore, they have substantially identical crystal structures. More specifically, it can be seen that every powder is composed of a compound having, as measured by the powder X-ray diffraction method, characteristic diffraction peaks at lattice spacing of 2.78±0.05 angstrom, lattice spacing of 2.62±0.05 angstrom and lattice spacing of 2.43±0.05 angstrom. This main peak group does not match with that of any compound in the X-ray diffraction data base (ICDD). This shows that the present invention provides a cathode active material for electrochemical cells composed of crystals of a compound having a composition such that the Ag/Bi atomic ratio is in the range of 2–7 and oxygen content is not less than 5 wt % and having, as measured by the powder X-ray diffraction method, main diffraction peaks at lattice spacing of 2.78±0.05 angstrom, lattice spacing of 2.62±0.05 angstrom and lattice spacing of 2.43±0.05 angstrom.

What is claimed is:

1. A cathode active material for alkaline electrochemical cell comprising an Ag—Bi-containing oxidation product produced by oxidizing with an oxidizing agent an Ag—Bi-containing neutralized precipitate obtained by reacting inorganic acid salts of silver and bismuth with an alkali hydroxide in an aqueous medium.

2. A cathode active material according to claim 1, wherein the oxidation product consists of particles having crystals of a compound composed of silver, bismuth and oxygen, in which bismuth is present throughout from the surface to the center of the particles.

3. A cathode active material according to claim 1, wherein the oxidation product has a silver content of not greater than 70 wt %.

4. A cathode active material according to claim 2, wherein the crystals of the compound are a three-element-system compound of Ag—Bi—O.

5. A cathode active material according to claim 1, wherein the oxidation product does not contain $Ag_2O$ and AgO or contains $Ag_2O$ and AgO only at the level of unavoidable impurities.

6. A cathode active material according to claim 2, wherein the particles have a composition such that Ag/Bi mol ratio is 1–7 and oxygen content is not less than 5 wt %.

7. A cathode active material according to claim 2, wherein the particles have a composition such that Ag/Bi mol ratio is 2–5 and oxygen content is not less than 5 wt %.

8. A cathode active material according to claim 2, wherein the particles have an average particle diameter of 0.1–10 $\mu$m.

9. A cathode active material for alkaline electrochemical cell comprising an Ag—Bi-M-containing oxidation product produced by oxidizing with an oxidizing agent an Ag—Bi-M-containing neutralized precipitate obtained by reacting inorganic acid salts of silver, bismuth and M with an alkali hydroxide in an aqueous mediums, wherein M represents at least one metal selected from the group consisting of manganese, nickel and cobalt.

10. A cathode active material according to claim 9, wherein the oxidation product consists of particles having crystals of a compound composed of silver, bismuth, M and oxygen, in which bismuth is present throughout from the surface to the center of the particles.

11. A cathode active material according to claim 9, wherein the oxidation product has a silver content of not greater than 75 wt %.

12. A cathode active material according to claim 10, wherein the crystals of the compound are composed of Ag, Bi, M and O.

13. A cathode active material according to claim 10, wherein the oxidation product does not contain $Ag_2O$ and AgO or contains $Ag_2O$ and AgO only at the level of unavoidable impurities.

14. A cathode active material according to claim 9, wherein the particles have a composition such that Ag/(Bi+M) mol ratio is 1–7 and oxygen content is not less than 5 wt %.

15. A cathode active material according to claim 14, wherein the particles have a composition such that Bi/M mol ratio is 0.1–100, preferably 1–10.

16. A cathode active material according to claim 9, wherein the particles have an average particle diameter of 0.1–10 μm.

17. A cathode active material for alkaline electrochemical cell comprising an Ag—Ri-containing oxidation product obtained by reacting inorganic acid salts of silver and bismuth with an alkali hydroxide in an aqueous medium and in the presence of an oxidizer.

18. A cathode active material according to claim 17, wherein the oxidation product consists of particles having crystals of a compound composed of silver, bismuth and oxygen, in which bismuth is present throughout from the surface to the center of the particles.

19. A cathode active material according to claim 17, wherein the oxidation product has a silver content of not greater than 70 wt % and does not contain $Ag_2O$ and AgO or contains $Ag_2O$ and AgO only at the level of unavoidable impurities.

20. A cathode active material for alkaline electrochemical cell comprising an Ag—Bi-M-containing oxidation product obtained by reacting inorganic acid salts of silver, and bismuth and M with an alkali hydroxide in an aqueous medium and in the presence of an oxidizer, wherein M represents at least one metal selected from the group consisting of manganese, nickel and cobalt.

21. A cathode active material according to claim 20, wherein the oxidation product consists of particles having crystals of a compound composed of silver, bismuth, M and oxygen, in which bismuth is present throughout from the surface to the center of the particles.

22. A cathode active material according to claim 20, wherein the oxidation product has a silver content of not greater than 75 wt % and does not contain $Ag_2O$ and AgO or contains $Ag_2O$ and AgO only at the level of unavoidable impurities.

23. A cathode active material for alkaline electrochemical cell comprising particles having crystals of a compound composed of silver, bismuth and oxygen whose Ag/Bi mol ratio is 1–7 and oxygen content is not less than 5 wt %, in which bismuth is present throughout from the surface to the center of the particles, the compound containing substantially no compound crystals of $Ag_2O$ and AgO.

24. A cathode active material for alkaline electrochemical cell comprising particles having crystals of a compound composed of silver, bismuth, M and oxygen whose Ag/(Bi+M) ratio is 1–7, Bi/M mol ratio is 1–10 and oxygen content is not less than 5 wt %, in which bismuth is present throughout from the surface to the center of the particles, the compound containing substantially no compound crystals of $Ag_2O$ and AgO, wherein M represents at least one metal selected from the group consisting of manganese, nickel and cobalt.

25. A cathode active material according to claim 23, wherein Ag content is 45–70 wt %, Bi content is 20–40 wt %.

26. A cathode active material according to claim 24, wherein Ag content is 45–75 wt %, Bi content is 10–40 wt %, M content is 0.5–10 wt % and O (oxygen) content is 5–20 wt %.

27. An alkaline electrochemical cell comprising an anode active material, a cathode active material and an electrolyte, the cathode active material of the alkaline electrochemical cell comprising an Ag—Bi-containing oxidation product produced by oxidizing with an oxidizing agent an Ag—Bi-containing neutralized precipitate obtained by reacting inorganic acid salts of silver and bismuth with an alkali hydroxide in an aqueous medium.

28. An alkaline electrochemical cell according to claim 27, wherein the oxidation product consists of particles having crystals of a compound composed of silver, bismuth and oxygen, in which bismuth is present throughout from the surface to the center of the particles.

29. An alkaline electrochemical cell comprising an anode active material, a cathode active material and an electrolyte, the cathode active material of the alkaline electrochemical cell comprising an Ag—Bi-M-containing oxidation product produced by oxidizing with an oxidizing agent an Ag—Bi-M-containing neutralized precipitate obtained by reacting inorganic acid salts of silver, bismuth and M with an alkali hydroxide in an aqueous medium, wherein M represents at least one metal selected from the group consisting of manganese, nickel and cobalt.

30. An alkaline electrochemical cell according to claim 29, wherein the oxidation product consists of particles having crystals of a compound composed of silver, bismuth, M and oxygen, in which bismuth is present throughout from the surface to the center of the particles.

31. An alkaline electrochemical cell comprising an anode active material, a cathode active material and an electrolyte, the cathode active material of the alkaline electrochemical cell comprising an Ag—Bi-containing oxidation product obtained by reacting inorganic acid salts of silver and bismuth with an alkali hydroxide in an aqueous medium and in the presence of an oxidizer.

32. An alkaline electrochemical cell according to claim 31, wherein the oxidation product consists of particles having crystals of a compound composed of silver, bismuth and oxygen, in which bismuth is present throughout from the surface to the center of the particles.

33. An alkaline electrochemical cell comprising an anode active material, a cathode active material and an electrolyte, the cathode active material of the alkaline electrochemical cell comprising an Ag—Bi-M-containing oxidation product obtained by reacting inorganic acid salts of silver, and bismuth and M with an alkali hydroxide in an aqueous medium and in the presence of an oxidizer, wherein M represents at least one metal selected from the group consisting of manganese, nickel and cobalt.

34. An alkaline electrochemical cell according to claim 33, wherein the oxidation product consists of particles having crystals of a compound composed of silver, bismuth, M and oxygen, in which bismuth is present throughout from the surface to the center of the particles.

35. A cathode active material for electrochemical cell comprising crystals of a compound having a composition such that Ag/Bi atomic ratio is 2–7 and oxygen content is not less than 5 wt % and having, as measured by the powder X-ray diffraction method, main diffraction peaks at lattice spacing of 2.78±0.05 angstrom, lattice spacing of 2.62±0.05 angstrom and lattice spacing of 2.43±0.05 angstrom.

36. An alkaline electrochemical cell comprising an anode active material, a cathode active material and an electrolyte, the cathode active material of the alkaline electrochemical cell comprising crystals of a compound having a composition such that Ag/Bi atomic ratio is 2–7 and oxygen content is not less than 5 wt % and having, as measured by the powder X-ray diffraction method, main diffraction peaks at lattice spacing of 2.78±0.05 angstrom, lattice spacing of 2.62±0.05 angstrom and lattice spacing of 2.43±0.05 angstrom.

* * * * *